(No Model.)
F. A. PURCELL & J. K. CASE.
SPOOL HOLDER.
No. 377,436. Patented Feb. 7, 1888.
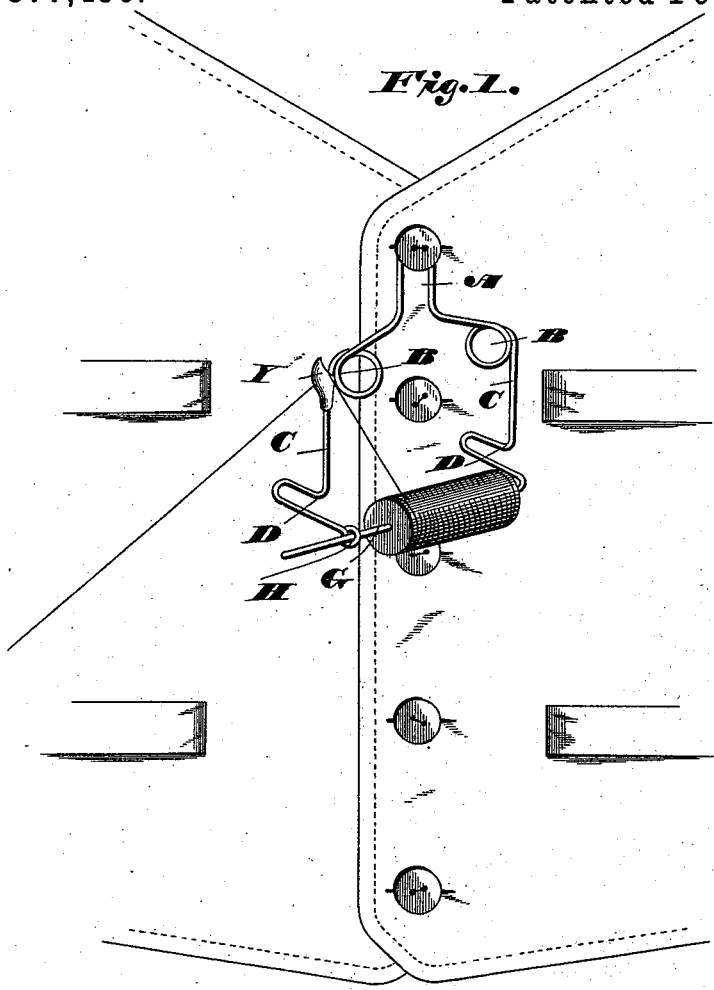
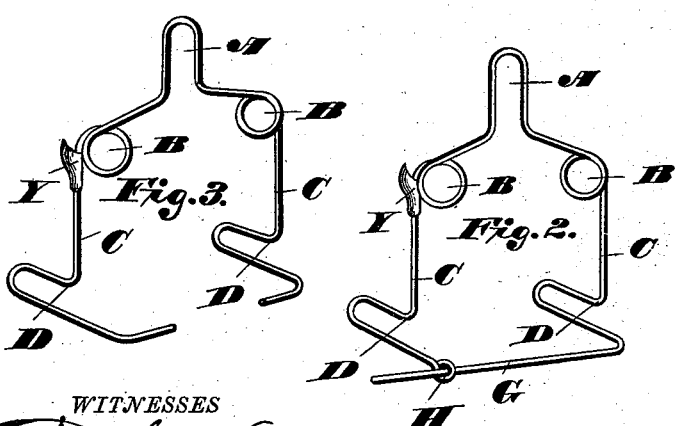
WITNESSES
Frank A. Purcell
John K. Case.
INVENTORS
By Smith & Sheehy
Attorneys

UNITED STATES PATENT OFFICE.

FRANK A. PURCELL AND JOHN K. CASE, OF VINCENNES, INDIANA.

SPOOL-HOLDER.

SPECIFICATION forming part of Letters Patent No. 377,436, dated February 7, 1888.

Application filed November 10, 1887. Serial No. 254,795. (No model.)

*To all whom it may concern:*

Be it known that we, FRANK A. PURCELL and JOHN K. CASE, citizens of the United States, residing at Vincennes, in the county of Knox and State of Indiana, have invented certain new and useful Improvements in Spool-Holders; and we do declare the following to be a full, clear, and exact description of the invention, such as will enable others skilled in the art to which it appertains to make and use the same.

This invention relates to implements for tailors' and dress-makers' use; and it consists in a combined spool-holder and thread-cutter adapted for attachment to a garment, as hereinafter specified and claimed.

The nature of the invention will be fully understood from the following description and claim, when taken in connection with the accompanying drawings, in which—

Figure 1 is a perspective view of my improved spool-holder and thread-cutter attached to the vest-button of a vest, showing the spool in position with the thread extended over the cutter ready to be cut, as shown. Fig. 2 is a perspective view of the spool-holder detached. Fig. 3 is a modification in perspective of the same.

This spool-holder is preferably formed of a single piece of wire, as represented on the drawings.

Referring to the said drawings by letter, A designates the loop, which is adapted to slip over the thread of a button, so as to support it in a convenient position to the worker.

B designates the wire springs, which are so formed as to retract the arms C to their normal position after a spool has been attached to or removed from the holding arm or journal. The wire is, furthermore, bent rearward, as shown at D, thereby forming a loop-shaped figure on each side to provide frictional bearings or stops for the ends of a spool. It will be observed that one of the arms C is made considerably longer than the other. This longer arm, after being bent rearward and forward to form a loop, D, is bent again at a right angle with the main body of the arms to form a spindle or spool-holder proper, as shown at G. On the end of the shortest arm C we form an eye, H, through which the point of the spindle G is passed, as represented. It is obvious that instead of forming the spindle G from one long arm of the device and an eye, H, on the shorter arm, we may make both arms of equal length and form as a substitute for the spindle by bending the lower end of each arm inward, as shown on Fig. 3 of the drawings. We very much prefer, however, to form a full spindle by means of a long arm and have its point passed through an eye of the short arm, as above described. In place of the eye H, it is obvious that a hook might be constructed so that the spindle may be hooked and unhooked instead of being thrust sidewise through an eye. In use, however, we find the eye preferable to a hook.

The letter Y represents a small knife, which we attach to any convenient point upon the wire by solder or otherwise. This knife enables the operator to sever the thread at will. It is obvious that this knife may be formed with the spool-holder, if desired.

We are aware that it is not new to form a spool-holder from wire, and that such holders have been provided with cutters, and therefore do not claim such devices, broadly.

Having described this invention, what we claim is—

As an improved article of manufacture, the combined spool-holder and thread-cutter herein described, consisting, essentially, of a single piece of wire bent about midway of its length to form the loop A, and thence outwardly in opposite directions and formed in coils B B, downwardly-straight arms C C, having rearward loops, D D, at their lower straight portion, and one of the said arms terminating in an eye, H, and the other one in a spindle, G, to receive the spool and enter the said eye, and the cutter Y, secured to the upper end of one of the arms C, substantially as shown.

In testimony whereof we affix our signatures in presence of two witnesses.

FRANK A. PURCELL.
JOHN K. CASE.

Witnesses:
W. A. CULLOP,
JAMES P. L. WEEMS.